May 28, 1957 V. G. KLEIN ET AL 2,793,593
INJECTOR
Filed Feb. 1, 1954 2 Sheets-Sheet 1
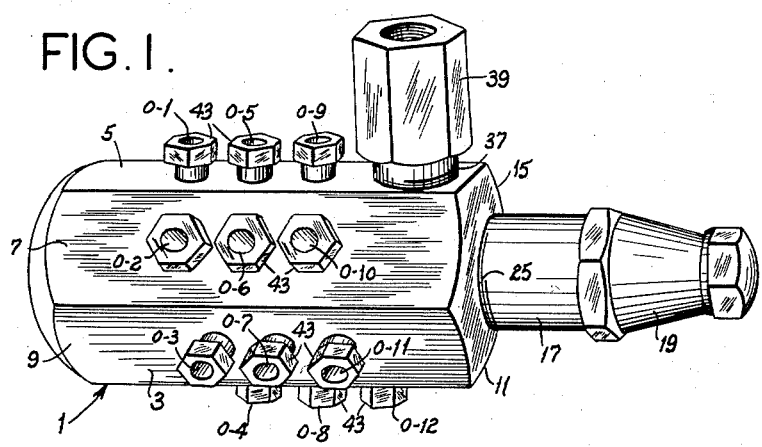
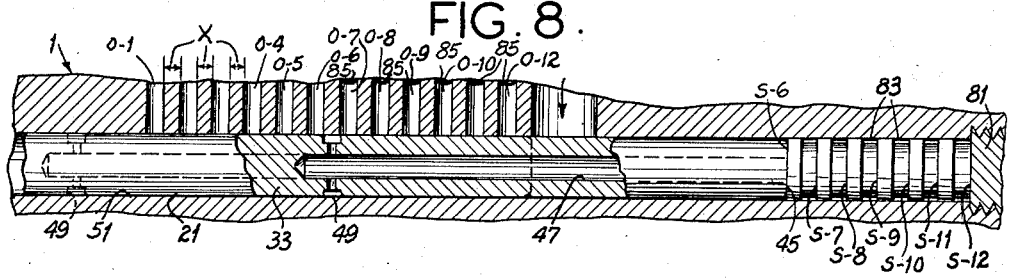
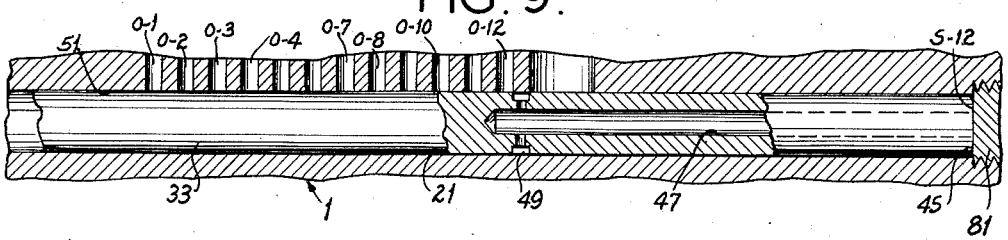
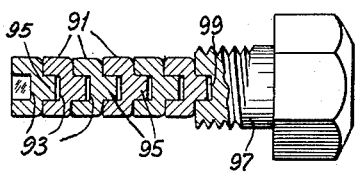
Victor G. Klein,
Carl H. Mueller,
Inventors.
Koenig and Pope,
Attorneys.

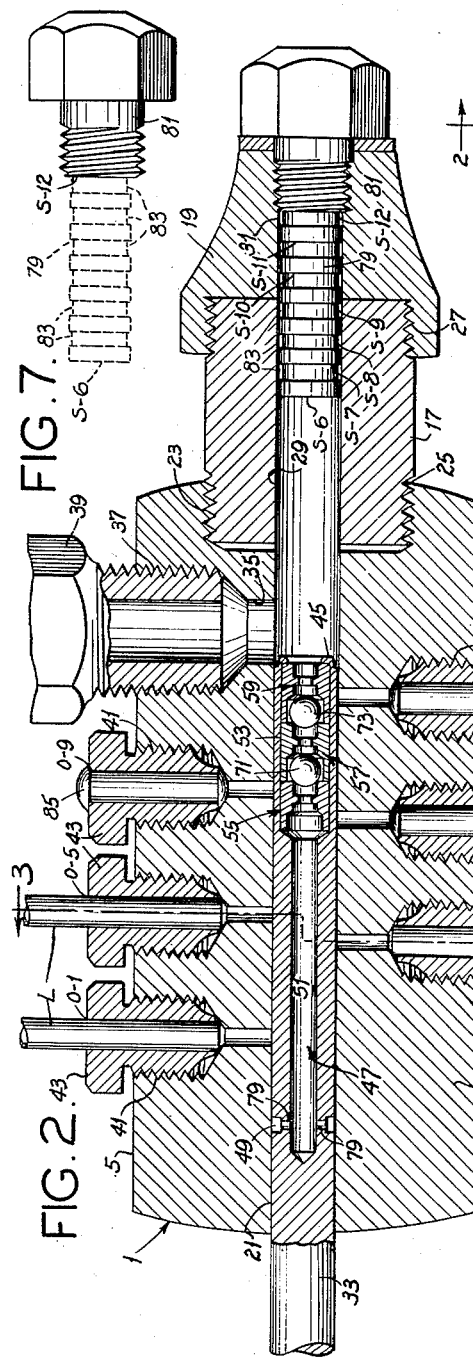

United States Patent Office 2,793,593
Patented May 28, 1957

2,793,593
INJECTOR

Victor G. Klein, Defiance, and Carl H. Mueller, Pasadena Hills, Mo., assignors to The McNeil Machine & Engineering Company, Akron, Ohio, a corporation of Ohio Application February 1, 1954, Serial No. 407,369

10 Claims. (Cl. 103—2)

This invention relates to injectors, and more particularly to a lubricant injector of the type comprising a cylinder having a series of longitudinally spaced outlet ports, and a plunger movable in the cylinder for successively forcing out individual measured charges of lubricant through the outlet ports to lubricant feed lines for delivery to individual points of lubrication upon movement of the plunger through a pressure stroke.

Among the several objects of the invention may be noted the provision of an injector of the class described which may be readily adapted to accommodate different numbers of points of lubrication up to the total number of outlet ports of the injector, and which insures against loss of prime; and the provision in an injector of this class of an improved plunger check valve construction which eliminates any necessity for use of individual check valves in the respective outlet ports and which further insures against loss of prime. Other objects and features will be in part apparent and in part pointed out hereinafter.

The invention accordingly comprises the constructions hereinafter described, the scope of the invention being indicated in the following claims.

In the accompanying drawings, in which several of various possible embodiments of the invention are illustrated, Fig. 1 is a perspective view of an injector embodying the invention having twelve longitudinally spaced and angularly offset lateral outlet ports;

Fig. 2 is an enlarged central vertical longitudinal cross section of the injector, taken on line 2—2 of Fig. 3, illustrating the injector as adapted to accommodate six lubrication points, and showing the plunger of the injector in its retracted, charging position;

Fig. 3 is a transverse cross section taken on line 3—3 of Fig. 2;

Fig. 4 is an enlarged fragment of Fig. 2 illustrating details of the plunger check valve construction;

Fig. 5 is a transverse cross section taken on line 5—5 of Fig. 4;

Fig. 6 is a horizontal longitudinal cross section taken on line 6—6 of Fig. 4;

Fig. 7 is a side elevation of a plunger stop of the invention, illustrating by means of dotted lines how the stop is modified to adapt the injector to accommodate more than six and up to twelve lubrication points;

Fig. 8 is a longitudinal cross section similar to Fig. 2 with parts broken away, but semidiagrammatic to the extent of illustrating all the outlet ports in a common plane rather than angularly offset, and showing the plunger in forward position at the end of a pressure stroke;

Fig. 9 is a view similar to Fig. 8 illustrating the injector adapted for discharge through all twelve outlet ports; and, Fig. 10 is a view partly in side elevation and partly in longitudinal cross section of a modified form of the plunger stop.

Corresponding reference characters indicate corresponding parts throughout the several views of the drawings.

Referring to the drawings, an injector constructed in accordance with this invention is shown to comprise a cylinder generally designated by the reference character 1. The cylinder comprises an elongate cylinder block 3 of hexagonal cross section, thereby having six sides designated 5, 7, 9, 11, 13 and 15 (see Figs. 1 and 3). The cylinder further comprises a cylindrical extension 17 projecting from one end of the block 3. On the end of the extension 17 is a head 19. The block 3 has a central longitudinal bore 21 with a counterbore 23 at one end. Extension 17 is threaded in the counterbore as indicated at 25. Head 19 is threaded on the extension 17 as indicated at 27. Extension 17 has a bore 29 and head 19 has a bore 31 coaxial with and of the same diameter as bore 21 and in extension of the latter. A plunger 33 is movable in the cylinder 1 toward and away from its forward or head end (its right end as viewed in Figs. 1 and 2). The plunger is dimensioned to have a sliding sealing fit in the bores 21, 29 and 31. It may be operated manually, mechanically or electrically. Mechanical operation may be effected as by means of an air motor.

In the block 3 is a lateral inlet port 35 and a series of longitudinally spaced lateral outlet ports. Twelve outlet ports are shown, designated by the reference characters O-1 to O-12. It will be understood that this number of outlet ports is shown only by way of example, and that the injector may have a different number of outlet ports. The inlet port 35 is located toward the end of the block which receives the extension 17, and the outlet ports are located between the other end of the block (its rearward end) and the inlet port. The inlet port is located in the side 5 of the block. The outlet ports are successively angularly offset, ports O-1, O-5 and O-9 being aligned in a row along the side 5 of the block, ports O-2, O-6 and O-10 being aligned in a row along the side 7, ports O-3, O-7 and O-11 being aligned in a row along the side 9, and ports O-4, O-8 and O-12 being aligned in a row along the side 11. Sides 13 and 15 are completely closed. The inlet port at its outer end is formed as a threaded socket 37 for receiving a hose coupling 39 for connection of a hose leading from a lubricant reservoir (not shown). The reservoir may be simply located higher than the injector for gravity feed to the injector. Each outlet port at its outer end is formed as an enlarged threaded socket 41 for receiving a compression nut 43 for connection of a lubricant delivery line L, such as a metal tube, to the port.

The forward or working end of the plunger toward the head end of the injector is designated 45. The plunger is made hollow for some distance from its working end to provide a longitudinal passage generally designated 47 for communication from the space in the cylinder 1 ahead of the plunger to a lateral port 49 in the plunger spaced from its working end. The passage 47 is provided by forming a bore 51 in the plunger with a counterbore 53 toward the working end of the plunger. This counterbore constitutes a valve chamber. Three identical check valve seat members 55, 57 and 59 are received in the counterbore or chamber 53 in end-to-end abutting relation, member 55 being located at the inner end of the counterbore, member 57 being next, and member 59 being at the outer end of the counterbore. Each seat member comprises a cylindrical body 61, made for example of nylon, having a sealing fit in the counterbore 53. The body 61, at one end which constitutes its inlet end, has a diametric slot 63. From the bottom of this slot, an inlet port 65 leads to a recess 67 in the other end of the body 61, the latter being formed with an annular conical shoulder or seat 69 at the inner and forward end of the recess 67. The three seat members are all located in the counterbore with their slotted ends toward the working end of the plunger. A valve ball 71 is provided in the recess 67 of intermediate seat member 57 and a valve ball 73 is provided in the recess 67 of outer seat member 59. Ball 71 is adapted to engage the seat 69 in member 57 and ball 73 is adapted to engage the seat 69 in member 59. The ball diameter is less than that of recesses 67, and greater than the width of the slots 63. While the balls need not be spring-biased toward their seats, one or both may be backed by a light spring, if desired. As shown, the ball 71 is backed by a light conical compression spring 75. The seat members are held in the counterbore 53 by peening over the end of the plunger as indicated at 77.

The lateral port 49 in the plunger is formed as an annular peripheral groove with radial openings 79 from the passage 47 to the groove. The intervals between the outlet ports O-1 to O-12 are made equal to the width of the port or groove 49. By "interval" is meant the distance in longitudinal direction from the trailing edge of any outlet port (its right edge nearest the right end of the cylinder) to the leading edge (the left edge) of the next successive port. These intervals are indicated at X in Fig. 8, each being equal to the width of groove 49. The distance from the working end of the plunger 33 to the forward (right) edge of the groove 49 is made equal to the distance from the most forward point of the forward (right) edge portion of the inlet port 35 to the most rearward point of the rearward (left) edge portion of the first outlet port O-1 so that when the plunger is moved forward from the retracted charging position shown in Fig. 2 wherein it unblocks the inlet port 35, the groove 49 comes into communication with the first outlet port O-1 as the plunger reaches the position where it blocks off the inlet port. When the plunger is in its retracted position, lubricant may flow through the inlet port into the space in cylinder 1 ahead of the plunger to charge the injector. The groove 49 is then located to the left of the first outlet port O-1 and is blocked.

A stop for limiting the forward or discharge stroke of the plunger is indicated at 79. This stop is shown in Fig. 2 as an integral cylindrical extension of a screw 81 which is threaded in the outer end of the bore 31 in the head 19 and which constitutes a closure for the forward end of the cylinder 1 (its right end as viewed in the drawings). It is formed with longitudinally spaced shallow annular grooves 83 wide enough to receive a hack saw blade and spaced at intervals corresponding to the spacing of the outlet ports. As herein illustrated, the length of the stop is such that, with the screw 81 threaded in the bore 31, the stop extends into the bore 29 and its end face indicated at S-6 is located for engagement by the forward end of the plunger when the plunger, moving forward through a discharge stroke, reaches a position wherein the plunger port or groove 49 has just passed the sixth outlet port O-6 and is in a position between the sixth outlet port O-6 and the seventh outlet port O-7 (see Fig. 8). Six grooves 83 are provided and these serve as markers and saw blade guides for sawing off the stop at any one of faces indicated at S-7 to S-12 at the right sides of the grooves. The right sides of the grooves are spaced at intervals corresponding to the spacing of the outlet ports. The end face S-6 of the stop is forward of the inlet port 35.

Assuming that it is desired to use the injector to dispense individual measured charges of lubricant only to six points of lubrication, the full length of stop 79 to end face S-6 is retained, as shown in Figs. 2 and 8. Lubrican feed lines L are connected to outlet ports O-1 to O-6 and to the six lubrication points. Each of outlet ports O-7 to O-12 is plugged as by removing the respective compression nut 43 and plugging the opening in the nut with a rivet 85, then replacing the nut in its respective socket 37. The system is primed with oil by removing the screw 81 and the stop 79, allowing some oil to flow from the reservoir to the injector and out through the end of bore 31, then replacing the screw 81 and stop 79. This insures washing all foreign matter from the lubricant supply line and excludes air pockets. The points of lubrication (bearings) and the lubricant delivery lines may be filled for priming by cycling the injector, but this may be more quickly effected, if desired, by filling each line with a gun before it is connected to the injector. The bearing fed by each line is filled upon filling the line.

When the plunger is driven forward through a pressure stroke from its retracted charging position shown in Fig. 2, lubricant is displaced from within the space in the cylinder 1 ahead of the plunger outward through the inlet port 35 and back to the reservoir until the plunger reaches a position wherein it blocks off the inlet port and wherein the right edge of plunger groove 49 first encounters the leading (left) edge of the first outlet port O-1. Then, as the groove 49 crosses port O-1, both valve balls 71 and 73 are open and a charge of lubricant is forced out from the cylinder through the passage 47, the radial plunger ports 79, the groove 49 and the outlet port O-1 in amount determined by the displacement of the plunger as it moves through the complete distance over which the groove 49 is open to the port O-1. As the plunger continues its pressure stroke, the right edge of the groove 49 next encounters the leading (left) edge of the next outlet port O-2, as the left edge of groove 49 is cut off from the preceding port O-1. Then as the groove 49 crosses port O-2, a charge of lubricant is forced out of the cylinder through the port O-2 in amount the same as previously discharged through port O-1. This action is repeated as the groove 49 crosses the remaining outlet ports O-3 to O-6. The forward end of the plunger engages end face S-6 of the stop 79 as soon as the groove 49 has completed crossing port O-6 (and before it reaches port O-7) to stop the forward movement of the plunger (see Fig. 8). Thus, as the plunger is driven through a pressure stroke from its priming position, equal charges of lubricant are forced out of the cylinder successively through the outlet ports O-1 to O-6 one after another.

Upon return of the plunger to retracted position (Fig. 2), the cylinder 1 is recharged with lubricant for the next operation, lubricant flowing into the space in the cylinder 1 ahead of the plunger to fill the space. During the return movement of the plunger, balls 71 and 73 engage their seats 69 to prevent any loss of prime from the system comprising the plunger passage 47, openings 79, groove 49, the outlet ports, the lubricant lines and the bearings. It will be noted that on a return stroke of the plunger, the groove 49 crosses the outlet ports, and that unless the plunger passage is effectively blocked, some lubricant may flow from the lubricant lines into the space in cylinder 1 ahead of the plunger before the forward end of the plunger is retracted past the inlet port. The provision of the double check valve arrangement in the plunger is of considerable importance in that it insures effective blocking of the plunger passage on plunger return strokes and minimizes the possibility of loss of prime. If a single check valve were used, and if there should be any foreign matter in the lubricant, such matter may foul the valve seat and prevent the valve from closing. However, with the double check valve arrangement, it is unlikely that both valves would simultaneously fail to close on a return stoke of the plunger.

Assuming that it is desired to use the injector to dispense individual measured charges of lubricant to more than six points of lubrication, the stop 79 is removed and cut off at that one of faces S-7 to S-12 appropriate to the number of outlets needed. For example, when it is desired to use all twelve outlets for dispensing measured charges to twelve points of lubrication, the stop 79 is sawed off to expose face S-12. The stop is shown in this phase in Figs. 7 and 9. The dotted lines in Fig. 7 illustrate the removed portion of the stop. The face S-12 may be coincident with the end of the screw 81 as shown. Lubricant lines are connected to outlets O-7 to O-12 by the compression nuts, no plugging by rivets being needed in this case. By cutting off the stop to expose face S-12, the pressure stroke of the plunger is increased so that the plunger port 49 will cross all twelve of the outlet ports O-1 to O-12 before the plunger is stopped by engagement of its forward end with the face S-12. The plunger is stopped as soon as the groove 49 has completed crossing port O-12, and before it reaches the inlet port 35 (see Fig. 9).

It will be understood that the stop may as well be cut off at any one of faces S-7 to S-11, as required, in order to accommodate from seven to eleven lubricant lines. In any case, the unused outlet ports are plugged by rivets in the respective compression nuts. With the stop herein illustrated, the injector would not be used for less than six delivery lines, but situations where less than six delivery lines would be needed are few. In any event, the stop may have a greater initial length than that herein shown.

When the plunger is driven forward through a pressure stroke, the valve balls 71 and 73 are forced back away from their seats 69 to the point where they engage the edges of the grooves 63. Since the balls are of greater diameter than the width of the grooves, spaces are provided for flow of lubricant around the balls into the grooves and thence through the ports 65. In this connection, it is to be noted that the depth of the grooves is such that the balls do not enter the grooves far enough to block the ports 65 in members 55 and 57. As the plunger is driven through a pressure stroke, the seats are washed clean, and hence the possibility that on the next pressure stroke both valves will simultaneously fail to close is greatly minimized.

The stop 79 plugs the end of the cylinder 1 sufficiently to avoid having any substantial dead space therein wherein air pockets may develop. The grooves 83 are only deep enough to guide a hack saw blade.

Fig. 10 illustrates a modified form of the stop which may be readily built up in length or made shorter, as desired, without the use of tools. As shown, this modified stop consists of a stacked arrangement of disks 91. Each disk has a central socket 93 in one face and a stud 95 projecting from its other face. The studs are sized for a friction fit in the sockets. The disks are assembled face-to-face with the studs received in the sockets. The built-up stop assembly is assembled with a screw 97 corresponding to the screw 81 by fitting the stud on an end disk of the stop assembly into a socket 99 in the end of the screw. The disks have a width corresponding to the spacing of the outlet ports and the stop may be built up to have as many disks as needed to correspond to the desired stroke for the plunger as determined by the number of lubricant lines desired.

In view of the above, it will be seen that the several objects of the invention are achieved and other advantageous results attained.

As various changes could be made in the above constructions without departing from the scope of the invention, it is intended that all matter contained in the above description or shown in the accompanying drawings shall be interpreted as illustrative and not in a limiting sense.

We claim:

1. An injector comprising a cylinder, a removable closure for the cylinder at a forward end thereof, a plunger movable in the cylinder toward and away from its forward end, the cylinder having a lateral inlet port spaced from its forward end and a series of longitudinally spaced outlet ports between its other end and the inlet port, the plunger having a lateral port spaced from its forward end and a longitudinal passage for communication from the space in the cylinder ahead of the forward end of the plunger to said lateral port in the plunger, the intervals between the successive outlet ports being equal to the width of the lateral port in the plunger, the distance from the forward end of the plunger to the forward edge portion of the lateral plunger port being equal to the distance from the most forward point of the forward edge portion of the inlet port to the most rearward point of the rearward edge portion of the first outlet port of the series, check valve means in the longitudinal plunger passage adapted to open upon movement of the plunger toward the forward end of the cylinder, the plunger having a charging position wherein its forward end is retracted past the inlet port for flow into the space in the cylinder ahead of the forward end of the plunger, and being movable forward from charging position toward the forward end of the cylinder to block the inlet port at the instant that the plunger port comes into communication with the first outlet port of the series and then successively to force out individual charges through the outlet ports as the lateral plunger port crosses the outlet ports, and a stop for the plunger extending into the cylinder from the removable closure for a distance such that the end of the stop is forward of the inlet port and located for engagement by the forward end of the plunger when the lateral plunger port has crossed only a part of the series of outlet ports, so that, by blocking the remainder of the series of outlet ports, individual charges are forced out only through said part of the series of outlet ports upon forward movement of the plunger to the point where its forward end engages the stop, said stop being adapted for change of its length to vary the number of outlet ports crossed by the plunger port and through which discharge occurs.

2. An injector as set forth in claim 1, wherein the stop comprises a cylinder having annular grooves longitudinally spaced along its length at intervals corresponding to the spacing of the outlet ports, said grooves being adapted to guide a saw blade for sawing off the stop.

3. An injector as set forth in claim 1 wherein the removable closure comprises a screw threaded in the forward end of the cylinder, and the stop comprises an integral cylindrical extension of the screw having annular grooves longitudinally spaced along its length at intervals corresponding to the spacing of the outlet ports, said grooves being adapted to guide a saw blade for sawing off the stop.

4. An injector as set forth in claim 1 wherein the stop comprises a plurality of disks each having a width corresponding to the spacing of the outlet ports assembled in face-to-face relation and being separable one from another.

5. An injector as set forth in claim 4 wherein each disk has a socket in one face and a stud projecting from its other face, the disks being assembled with the studs received in the sockets.

6. An injector as set forth in claim 1 wherein the removable closure comprises a screw threaded in the forward end of the cylinder, and the stop comprises a plurality of disks each having a width corresponding to the spacing of the outlet ports assembled in face-to-face relation removably mounted on the end of the screw and separable from one another.

7. An injector as set forth in claim 6, wherein each disk has a socket in one face and a stud projecting from its other face, the disks being assembled with the studs received in the sockets, the stud on the end disk of the assembly at the end of the screw being fitted in a socket in the end of the screw.

8. An injector as set forth in claim 1 wherein the check valve means comprises two check valves arranged in series toward the forward end of the plunger.

9. An injector comprising a cylinder closed at a forward end thereof, a plunger movable in the cylinder toward and away from its forward end, the cylinder having a lateral inlet port spaced from its forward end and a series of longitudinally spaced outlet ports between its other end and the inlet port, the plunger having a lateral port spaced from its forward end and a longitudinal passage for communication from the space in the cylinder ahead of the forward end of the plunger to said lateral port in the plunger, the intervals between the successive outlet ports being equal to the width of the lateral port in the plunger, the distance from the forward end of the plunger to the forward edge portion of the lateral plunger port being equal to the distance from the most forward point of the forward edge portion of the inlet port to the most rearward point of the rearward edge portion of the first outlet port of the series, the plunger passage being formed to provide a valve chamber at the forward end of the plunger, longitudinally spaced valve seat members in the chamber having rearwardly facing valve seats, and valve members engageable with the seats upon rearward movement of the plunger, the plunger having a charging position wherein its forward end is retracted past the inlet port for flow into the space in the cylinder ahead of the forward end of the plunger, and being movable forward from charging position toward the forward end of the cylinder to block the inlet port at the instant that the plunger port comes into communication with the first outlet port of the series and then successively to force out individual charges through the outlet ports as the lateral plunger port crosses the outlet ports.

10. An injector comprising a cylinder closed at a forward end thereof, a plunger movable in the cylinder toward and away from its forward end, the cylinder having a lateral inlet port spaced from its forward end and a series of longitudinally spaced outlet ports between its other end and the inlet port, the plunger having a lateral port spaced from its forward end and a longitudinal bore with a counterbore at the forward end of the plunger for communication from the space in the cylinder ahead of the forward end of the plunger to said lateral port in the plunger, the intervals between the successive outlet ports being equal to the width of the lateral port in the plunger, the distance from the forward end of the plunger to the forward edge portion of the lateral plunger port being equal to the distance from the most forward point of the forward edge portion of the inlet port to the most rearward point of the rearward edge portion of the first outlet port of the series, three identical members in end-to-end abutting relation in the counterbore, each of said members comprising a cylindrical body having a diametric slot in its forward end and a port leading from the bottom of the slot to a recess in its rearward end, the intermediate and forward members of said three members constituting valve seat members and each having a rearwardly facing valve seat at the inner and forward end of said recess therein, a valve ball in the recess of the intermediate member and a valve ball in the recess of the forward member, the ball diameter being greater than the slot width, the plunger having a charging position wherein its forward end is retracted past the inlet port for flow into the space in the cylinder ahead of the forward end of the plunger, and being movable forward from charging position toward the forward end of the cylinder to block the inlet port at the instant that the plunger port comes into communication with the first outlet port of the series and then successively to force out individual charges through the outlet ports as the lateral plunger port crosses the outlet ports.

References Cited in the file of this patent

UNITED STATES PATENTS

| | | |
|---|---|---|
| 464,418 | Bird | Dec. 1, 1891 |
| 1,128,643 | Wetmore | Feb. 16, 1915 |
| 1,628,901 | Neilsen | May 17, 1927 |

FOREIGN PATENTS

| | | |
|---|---|---|
| 259,660 | Italy | July 21, 1928 |
| 450,025 | Great Britain | July 9, 1936 |
| 558,463 | Great Britain | Jan. 6, 1944 |